United States Patent [19]

Nakao et al.

[11] Patent Number: 4,919,716

[45] Date of Patent: Apr. 24, 1990

[54] METHOD FOR DISSOLUTION OF METAL

[75] Inventors: Yukimichi Nakao; Kyoji Kaeriyama; Aizo Yamauchi, all of Tsukuba, Japan

[73] Assignee: Agency of Industrial Science & Technology, Ministry of International Trade & Industry, Tokyo, Japan

[21] Appl. No.: 319,720

[22] Filed: Mar. 7, 1989

[30] Foreign Application Priority Data

May 19, 1988 [JP] Japan ................... 63-122852

[51] Int. Cl.$^5$ ............................... C22B 3/00
[52] U.S. Cl. .................... 423/658.5; 75/743;
423/22; 423/27; 423/32; 423/38; 423/51;
423/56; 423/87; 423/98; 423/109; 423/150
[58] Field of Search ................ 75/101 R, 120, 121,
75/114, 117, 119, 2; 423/38, 150, 109, 658.5, 22,
27, 32, 51, 56, 87, 98

[56] References Cited

U.S. PATENT DOCUMENTS

| 3,104,971 | 9/1963 | Olson et al. | 75/101 BE |
| 3,131,998 | 5/1964 | Swanson | 75/101 R |
| 3,409,415 | 11/1968 | Moore | 75/101 R |
| 4,012,481 | 3/1977 | Baltz et al. | 423/658.5 |
| 4,269,676 | 5/1981 | Libns et al. | 75/114 |
| 4,684,404 | 8/1987 | Kalocsai | 423/38 |

FOREIGN PATENT DOCUMENTS

| 0246226 | 12/1985 | Japan | 423/22 |
| 402571 | 8/1971 | U.S.S.R. | 75/101 R |
| 902337 | 8/1962 | United Kingdom | 423/658.5 |

Primary Examiner—Robert L. Stoll
Assistant Examiner—Steven J. Bos
Attorney, Agent, or Firm—Oblon, Spivak, McClelland, Maier & Neustadt

[57] ABSTRACT

A metal is dissolved by being brought into contact with at least one halogenated hydrocarbon in the presence of a cationic surfactant.

10 Claims, No Drawings

METHOD FOR DISSOLUTION OF METAL

BACKGROUND OF THE INVENTION

1. Field of the Invention

This invention relates to a method for the dissolution of a metal. More particularly, this invention relates to a method for the dissolution of a metal in a halogenated hydrocarbon by causing the metal to contact halogenated hydrocarbon containing a cationic surfactant.

2. Prior Art Statement

The dissolution of a metal is an indispensable step, for example, in the extraction and recovery of the metal from a mixture containing this metal and, therefore, is extremely important from the industrial point of view. It has been heretofore accomplished by placing the metal in an aqueous solution of such an inorganic acid as hydrochloric acid.

The conventional method for the dissolution of a metal by the use of an aqueous solution of an inorganic acid has the disadvantages of being highly dangerous to those conducting the work owing to the inevitable use of a strongly acidic solution and of entailing enormous costs for the treatment of a large volume of waste water arising from the work.

OBJECT AND SUMMARY OF THE INVENTION

The inventors continued a study with a view to solving the problems of the prior art mentioned above by the establishment of a method for the dissolution of metal without requiring use of any aqueous solution. As a result, they found that numerous metals are dissolved when they are brought into contact with a liquid halogenated hydrocarbon in the presence of a cationic surfactant. This invention has been accomplished as a result.

To be specific, the present invention is directed to providing a method for the dissolution of a metal, which method is characterized by effecting the dissolution by the contact of the metal with a halogenated hydrocarbon in the presence of a cationic surfactant.

DETAILED DESCRIPTION OF THE PREFERRED EMBODIMENT

In the method of this invention, a cationic surfactant and a metal for dissolution are added to a halogenated hydrocarbon. In this case, the dissolution of the metal may be accelerated by heating the reaction system when necessary and adding an organic solvent thereto to render the surfactant more soluble. The time required for the dissolution is variable with the kind of metal to be dissolved and the kind of surfactant and that of halogenated hydrocarbon to be used. The end point of the dissolution can be easily confirmed by complete disappearance of the metal.

As the surfactant for the method of this invention, a cationic surfactant of quaternary ammonium salt form can be used advantageously. Examples of surfactants answering the description include laurylpyridinium chloride, cetylpyridinium, chloride, stearyltrimethylammonium chloride, distearyldimethylammonium chloride, and octyltrimethylammonium chloride. This surfactant must be used in an amount of at least 1 mol per mol of the metal to be dissolved. The surfactant is not required to be thoroughly dissolved but may occur in a suspended state. When the surfactant is in a suspended state, the suspended surfactant is gradually dissolved as the solution of the metal proceeds.

As the halogenated hydrocarbon for the method of the present invention, a chlorinated hydrocarbon, a brominated hydrocarbon, or an iodinated hydrocarbon which is in a liquid state under working conditions can be used advantageously. Examples of the halogenated hydrocarbon used advantageously include benzyl chloride, benzal chloride, benzotrichloride, carbon tetrachloride, chloroform, benzyl bromide, bromobenzene, cyclohexyl bromide, and iodobenzene.

Here, the dissolving of the metal in the halogenated hydrocarbon presumably occurs because the halogenated hydrocarbon donates its halogen atom to the metal and consequently induces formation of a corresponding metal halide and, by the action of the cationic surfactant, this metal halide is converted into an ion pair, i.e. a metal polyhalide anion complex and an alkylammonium cation.

The metals suitable for dissolution with the halogenated hydrocarbon by the method of this invention include both typical metals and transition metals, namely chromium, manganese, iron, cobalt, nickel, copper, zinc, molybdenum, palladium, silver, tin, antimony, gold, lead, and bismuth, for example.

As described above, the dissolving of the metal by contact with the halogenated hydrocarbon in the presence of the cationic surfactant may be accelerated by adding an organic solvent to the reaction system or heating the reaction system or by adding the organic solvent and, at the same time, heating the reaction system.

The organic solvents which are usuable for this purpose include toluene, isooctane, tert-amyl alcohol, for example.

While the heating accelerates the dissolving of metal, the heating temperature is limited by the requirement that it should fall in the range in which the heating avoids volatilizing either the halogenated hydrocarbon or the solvent used in the reaction system.

The method of this invention is simple to operate as demonstrated in the following working examples and, moreover, is applicable effectively to a wide variety of metals and is advantageous in that the halogenated hydrocarbon and the surfactant to be used therein are inexpensive and relatively safe. In accordance with the method of this invention, therefore, the dissolving of a metal can be economically and safely attained. Further, as shown in a referential example, this method can be utilized for the recovery of a metal from a substance containing it.

Now, the present invention will be described more specifically below with reference to working examples.

EXAMPLES 1-11

Over a bath kept at 100° C., 10 g of benzyl chloride and 1 mmol of cetylpyridinium chloride added thereto and 0.2 g-atom of a metal indicated in Table 1 added in a powdered form thereto were stirred and heated. A case in which the metal powder was thoroughly dissolved before the completion of the heating was reported as effecting 100% solution. In any other case, the ratio of solution was determined by separating the residual metal powder from the reaction system by decantation, washing the separated metal powder with methanol, drying the washed metal powder, weighing the dry metal powder, and finding the difference between this weight from that of the charged metal powder. The results were as shown in Table 1.

TABLE 1

| Example | Metal | Heating time (hr) | Ratio of solution (%) |
|---|---|---|---|
| 1 | Chromium | 24 | 100 |
| 2 | Manganese | 24 | 100 |
| 3 | Iron | 2 | 100 |
| 4 | Cobalt | 24 | 100 |
| 5 | Nickel | 24 | 100 |
| 6 | Copper | 1 | 100 |
| 7 | Zinc | 1 | 100 |
| 8 | Palladium | 24 | 98 |
| 9 | Tin | 1 | 100 |
| 10 | Antimony | 24 | 96 |
| 11 | Lead | 2 | 100 |

EXAMPLES 12-15

Over a bath kept at 100° C., 10 g of benzyl bromide and 1 mmol of cetylpyridinium bromide added thereto and 0.2 g-atom of a metal indicated in Table 2 added in a powdered form thereto were stirred and heated. The results were as shown in Table 2. The ratios of solution of molybdenum and gold indicated in the table were calculated from the amounts of the metals in the reaction system measured by the atomic absorption method.

TABLE 2

| Example | Metal | Heating time (hr) | Ratio of solution (%) |
|---|---|---|---|
| 12 | Molybdenum | 24 | 47 |
| 13 | Silver | 1 | 100 |
| 14 | Gold | 24 | 20 |
| 15 | Bismuth | 2 | 100 |

EXAMPLES 16-18

Over a bath kept at 100° C., 10 g of a halogenated hydrocarbon indicated in Table 3 and 1 mmol of cetylpyridinium chloride added thereto and 0.2 g-atom of palladium powder added thereto were stirred and heated for 24 hours. The ratios of solution determined by the procedure of Examples 1-11 were as shown below.

TABLE 3

| Example | Halogenated hydrocarbon | Ratio of solution (%) |
|---|---|---|
| 16 | Benzotrichloride | 100 |
| 17 | Cyclohexyl bromide | 100 |
| 18 | Iodobenzene | 96 |

EXAMPLES 19-21

Over a bath kept at 100° C., 10 g of benzyl chloride and 1 mmol of a varying surfactant indicated in Table 4 added thereto and 0.2 g-atom of palladium powder added thereto were stirred and heated for 24 hours. The ratios of solution determined by the procedure of Examples 1-11 were as shown below.

TABLE 4

| Example | Surfactant | Ratio of solution (%) |
|---|---|---|
| 19 | Stearyltrimethylammonium chloride | 82 |
| 20 | Octyltrimethylammonium chloride | 88 |
| 21 | Distearyldimethylammonium chloride | 79 |

EXAMPLES 22 AND 23

The procedure of Example 7 and Example 9 were repeated, except that a mixture of 5 g of benzyl chloride with 5 g of tert-amyl alcohol was used in the place of 10 g of benzyl chloride. The results were as shown below.

TABLE 5

| Example | Metal | Heating time (hr) | Ratio of solution (%) |
|---|---|---|---|
| 22 | Zinc | 3 | 100 |
| 23 | Tin | 3 | 100 |

REFERENTIAL EXAMPLE

When 100 g of benzyl chloride and 10 mmols of cetylpyridinium chloride added thereto and 2 g-atoms of palladium powder further added thereto were stirred and heated for 48 hours over a bath kept at 100° C., the palladium powder completely disappeared and the mixture turned into a brown transparent solution. When this solution and 100 g of ethanol added thereto were heated to 100° C. and the resultant solution was stirred and then mixed with 10 mmols of dimethylamine boran, the palladium metal settled in a black precipitate and left behind a colorless supernatant. The supernatant was removed by decantation. The remaining precipitate was washed with ethanol and dried. Consequently, 0.205 g of black palladium powder was obtained. This result indicates that 96.2% of the initially charged palladium powder was recovered by the treatment described above.

What is claimed is:

1. A method for dissolving a metal in a halogenated hydrocarbon, which method consists essentially of causing said metal to contact at least one liquid halogenated hydrocarbon in the presence of a cationic surfactant.

2. A method according to claim 1, wherein said metal is at least one member selected from the group consisting of chromium, manganese, iron, cobalt, nickel, copper, zinc, molybdenum, palladium, silver, tin, antimony, gold, lead, and bismuth.

3. A method according to claim 1, wherein said cationic surfactant is a quaternary ammonium salt.

4. A method according to claim 3, wherein said quaternary ammonium salt is selected from the group consisting of laurylpyridinium chloride, cetylpyridinium chloride, stearyltrimethylammonium chloride, distearyldimethylammonium chloride, and octyltrimethylammonium chloride.

5. A method according to claim 1, wherein said surfactant is used in an amount of at least 1 mol per mol of the metal to be dissolved.

6. A method according to claim 1, wherein said halogenated hydrocarbon is at least one member selected from the group consisting of benzyl chloride, benzal chloride, benzotrichloride, carbon tetrachloride, chloroform, benzyl bromide, bromobenzene, cyclohexyl bromide, and iodobenzene.

7. A method according to claim 1, which further comprises heating said liquid halogenated hydrocarbon in contact with said metal in the presence of said cationic surfactant.

8. A method according to claim 1, wherein said contact of said metal with said liquid halogenated hydrocarbon in the presence of said cationic surfactant is carried out in the presence of an organic solvent.

9. A method according to claim 8, which further comprises heating said liquid halogenated hydrocarbon in contact with said metal in the presence of said cationic surfactant and said organic solvent.

10. A method according to claim 8, wherein said organic solvent is at least one member selected from the group consisting of toluene, isooctane, and tert-amyl alcohol.

* * * * *